United States Patent
Lazzeri et al.

(10) Patent No.: US 10,757,012 B2
(45) Date of Patent: Aug. 25, 2020

(54) PATH COMPUTATION IN A SEGMENT ROUTING NETWORK

(71) Applicant: Telefonaktiebolaget LM Ericsson (publ), Stockholm (SE)

(72) Inventors: Francesco Lazzeri, Genoa (IT); Gianmarco Bruno, Genoa (IT); Jeroen Nijhof, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 15/538,689

(22) PCT Filed: Dec. 23, 2014

(86) PCT No.: PCT/EP2014/079192
§ 371 (c)(1),
(2) Date: Jun. 22, 2017

(87) PCT Pub. No.: WO2016/102008
PCT Pub. Date: Jun. 30, 2016

(65) Prior Publication Data
US 2017/0346720 A1    Nov. 30, 2017

(51) Int. Cl.
*H04L 12/721*    (2013.01)
*H04L 12/733*    (2013.01)

(52) U.S. Cl.
CPC ............ *H04L 45/124* (2013.01); *H04L 45/20* (2013.01); *H04L 45/123* (2013.01)

(58) Field of Classification Search
CPC ....... H04L 45/00; H04L 47/125; H04L 45/12; H04L 45/20
See application file for complete search history.

(56) References Cited

U.S. PATENT DOCUMENTS

| | | | |
|---|---|---|---|
| 2004/0190517 A1* | 9/2004 | Gupta | H04L 45/10 370/392 |
| 2012/0069740 A1* | 3/2012 | Lu | H04L 45/04 370/238 |
| 2014/0369356 A1* | 12/2014 | Bryant | H04L 45/745 370/392 |

OTHER PUBLICATIONS

PCT International Search Report, dated Aug. 28, 2015, in connection with International Application No. PCT/EP2014/079192, all pages.

(Continued)

*Primary Examiner* — Romani Ohri
(74) *Attorney, Agent, or Firm* — Patent Portfolio Builders, PLLC

(57) ABSTRACT

A method of path computation in a segment routing network, the network comprising a set of nodes. The method comprises receiving a request for computation of a path between end nodes in the network, the request including a constraint. The method further comprises determining a segment identifier-optimised path defined by a stack of one or more segment identifiers, wherein the segment identifier-optimised path meets the constraint. The determining of the segment identifier-optimised path comprises analyzing a topology of the network comprising: at least a sub-set of the nodes, links between adjacent nodes indicative of possible paths between the nodes, and virtual links between pairs of nodes indicative of possible paths between the pairs of nodes. The method further comprises outputting at least one segment identifier which defines the determined path.

15 Claims, 12 Drawing Sheets

(56) References Cited

OTHER PUBLICATIONS

PCT Written Opinion, dated Aug. 28, 2015, in connection with International Application No. PCT/EP2014/079192, all pages.
Fernando Solano et al., Label Space Reduction in MPLS Networks: How Much Can a Single Stacked Label Do?, IEEE/ACM Transactions on Networking, vol. 16, No. 6, Dec. 2008, pp. 1308-1320.
Anupam Gupta et al., Exploring the Trade-off Between Label Size and Stack Depth in MPLS Routing, IEEE Infocom 2003, 12 pages.

* cited by examiner

KEY: X/Y, where X = cost, Y = constraint

KEY: X/Y, where X = cost, Y = metric

KEY: X/Y/Z,
where X = cost, Y = metric (e.g. delay), Z = number of ECMPs

Label Stack

Z

Label Stack

PATH COMPUTATION IN A SEGMENT ROUTING NETWORK

TECHNICAL FIELD

Embodiments relate to a method of path computation in a segment routing network and an apparatus for path computation in a segment routing network.

BACKGROUND

Segment Routing (SR) is an emerging technology which may be used in Multiprotocol Label Switching (MPLS) or Internet Protocol (IP) packet networks and which may be used in both a distributed control plane environment (e.g. an IP/MPLS control plane) and in a centralised control plane environment (e.g. SDN, Software Defined Networking).

Segment Routing, as defined by the Internet Engineering Task Force (IETF), enables enhanced packet routing, offering the ability to provide strict network performance guarantees whilst making more efficient use of network resources and providing greater scalability than other label-switched routing technologies which require a signalling protocol such as Resource Reservation Protocol-Traffic Engineering (RSVP-TE) to preconfigure end-to-end paths for data packets.

Segment Routing is based on two main concepts: Node Segment and Adjacency Segment. FIG. 1 shows an example network 10 with nodes A-G and Z. Each node in the network 10 is assigned a globally unique Segment Identifier (SID), called a node-SID. When a packet is injected at node A of the network with the segment identifier of node Z, nodes B-G will forward the packet to node Z via a shortest path which has been computed by the nodes at the time node Z was advertised to them. This is an unconstrained shortest path. In other examples, the node-SID is a locally unique identifier. In Adjacency Segment, an adjacency segment identifier, called an Adj-SID, identifies a particular link from a node. In FIG. 1, nodes B and C are connected by links with segment identifiers $\alpha$ and $\beta$. The adjacency SID can be a globally unique identifier or a locally unique identifier. If the adjacency SID is globally unique, the adjacency SID alone is enough to identify the link. If the adjacency SID is locally unique, then a combination of a node-SID and adjacency SID is required to identify the link.

A path computation entity (e.g. a PCE or an SDN controller) determines an end-to-end path for data packets across the packet network, and encodes this path as a set of ordered labels. Each label, as explained above, identifies a segment of the path. The set of labels is sent to the ingress network node. Each packet entering the network at ingress node A includes the set of labels in the header of the data packet. The ingress network node reads the outer, or uppermost, label and routes the data packets accordingly over the identified network segment to a further network node. The further network node drops the uppermost label, reads the next label and routes the data packets accordingly over the identified network segment and so on, until the data packets reach the egress network node.

A problem arises when a path is required to meet certain path constraints, such as total delay, bandwidth etc. The path computation entity can compute an end-to-end path which meets the required constraints. However, a row representation of the computed path as the sequence of all the node-SIDs/Adj-SIDs encountered along the path can require a large set of labels to define the hops of the path. Typically, routers in the network impose a limit on the maximum size of the label stack. Accordingly, it can be difficult to define a path which meets required constraints and yet has a label stack which is acceptable to equipment used at network nodes.

SUMMARY

An aspect of the invention provides a method of path computation in a segment routing network, the network comprising a set of nodes. The method comprises receiving a request for computation of a path between end nodes in the network, the request including a constraint; and determining a segment identifier-optimised path defined by a stack of one or more segment identifiers, wherein the segment identifier-optimised path meets the constraint. The determining of the segment identifier-optimised path comprises analyzing a topology of the network comprising: at least a sub-set of the nodes; links between adjacent nodes indicative of possible paths between the nodes, and virtual links between pairs of nodes indicative of possible paths between the pairs of nodes. The method further comprises outputting at least one segment identifier which defines the determined path.

An advantage of at least one example is that it is possible to determine a reduced label stack for a path while meeting a required constraint(s). For example, one of the constraints may be a maximum value of delay. One of the constraints may be a required bandwidth.

The method may determine a segment identifier-optimised label path which is defined by a label stack less than a maximum label stack size imposed by routers in the network.

An advantage of at least one example is that the method can scale more easily with network size.

Optionally, the method further comprises determining an initial optimum path between the end nodes which meets the constraint using a full topology of the network, the initial optimum path being defined by a sequence of hops between a sub-set of the nodes. The determining of a segment identifier-optimised path uses a topology comprising only: the sub-set of the nodes; the links of the initial optimum path and virtual links between only the sub-set of the nodes.

A further aspect provides an apparatus for path computation in a segment routing network, the apparatus comprising a processor and a memory. The memory contains instructions executable by the processor whereby the apparatus is operative to: receive a request for computation of a path between end nodes in the network, the request including a constraint; and determine a segment identifier-optimised path defined by a stack of one or more segment identifiers. The segment identifier-optimised path meets the constraint. The determining of the segment identifier-optimised path comprises analyzing a topology of the network comprising: at least a sub-set of the nodes; links between adjacent nodes indicative of possible paths between the nodes, and virtual links between pairs of nodes indicative of possible paths between the pairs of nodes. The apparatus is configured to output at least one segment identifier which defines the determined path.

A further aspect provides a computer program product comprising a machine-readable medium carrying instructions which, when executed by a processor, cause the processor to perform the method of any example.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
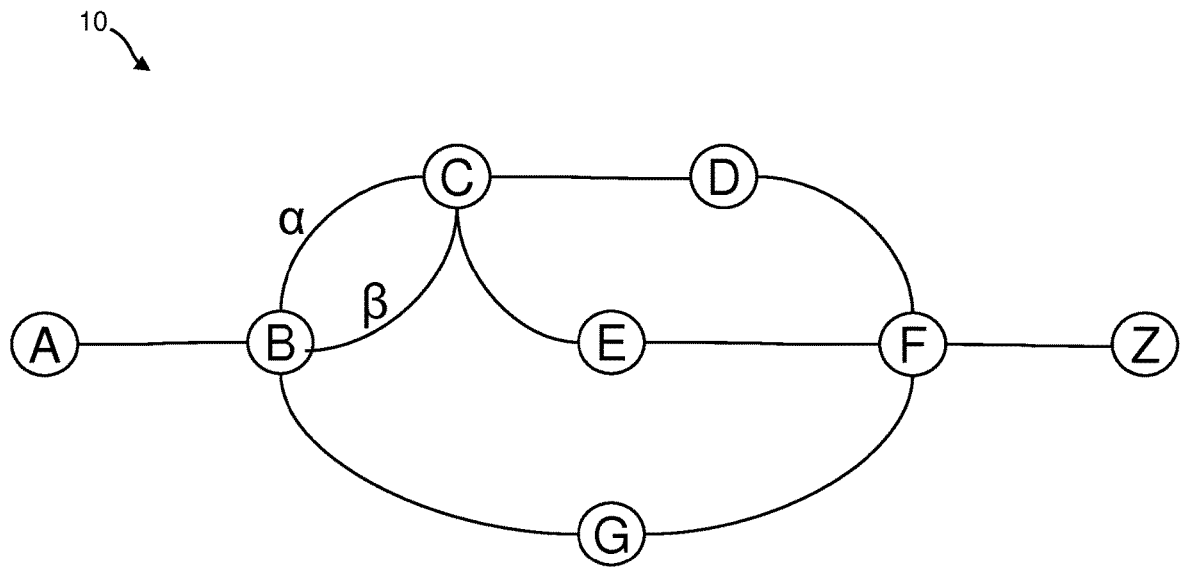
FIG. 1 shows an example network in which segment routing can be performed.
Figure 2:
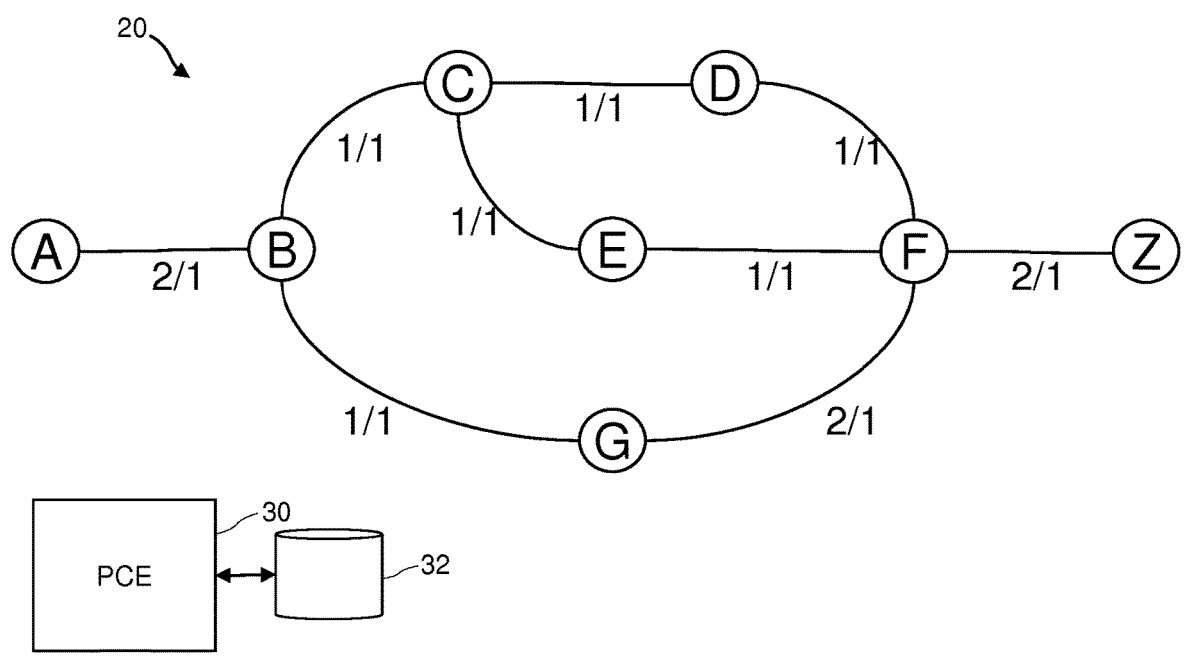
FIG. 2 shows an example network and a path computation entity.

FIG. 2 shows an example of a communication network 20. The network comprises nodes A-G and Z. Nodes comprise packet-forwarding capability. Typically, the node comprises a router which is capable of receiving a packet and forwarding the packet to another node of the network. As described above, the network uses segment routing identifiers (SIDs). A node segment identifier (node-SID) identifies a node of the network. An adjacency segment identifier (Adj-SID) identifies an adjacency of the network. The adjacency can be globally unique, or locally unique. A node-SID can be locally unique or globally unique but typically is globally unique by default.

Each node in the network maintains an Information Base by listening to information advertised by other nodes. Nodes advertise their Node-SID and optionally Adj-SIDs using routing protocols. When a new node-SID is advertised, the router receiving it computes the unconstrained shortest path from itself to the node represented by the node-SID and stores the result in its Routing Information Base (RIB). Using this information, each node is able to compute a shortest path to any other node in the network. When the node receives a packet with a label identifying a node-SID or an Adj-SID it can use the stored information to forward that packet along a shortest path route.

The network comprises a path computation element (PCE) 30. The PCE is a network entity which is capable of computing a path between an ingress node and an egress node of the network. The PCE can receive a path request which defines source and destination nodes of the path and one or more constraints for the path, such as total delay, bandwidth, path length, e.g. number of hops, or some other constraint. The PCE 30 maintains a database 32 of topology information which it can use to compute paths. The PCE 30 operates in a similar manner to the nodes, receiving topology information which is advertised by nodes using routing protocols. The PCE 30 could reside in one of the nodes of the network. Topology information can be advertised by one or more suitable routing protocols, such as Open Shortest Path First (OSPF), Intermediate System to Intermediate System (ISIS) or Border Gateway Protocol (BGP).

The PCE outputs a set of segment identifiers which define the computed path. The set of segment identifiers are sent to the ingress node. In accordance with examples, the PCE calculates a segment identifier-optimised path. This is a path which optimises (e.g. reduces or minimises) the number of SID labels required to define the path, while still meeting a required constraint. The calculated path may use Equal Cost Multiple Paths (ECMPs). Equal Cost Multiple Paths are paths which have the same cost, but take a different route through the network. Use of ECMPs can improve load balancing and resiliency.

Figure 3:
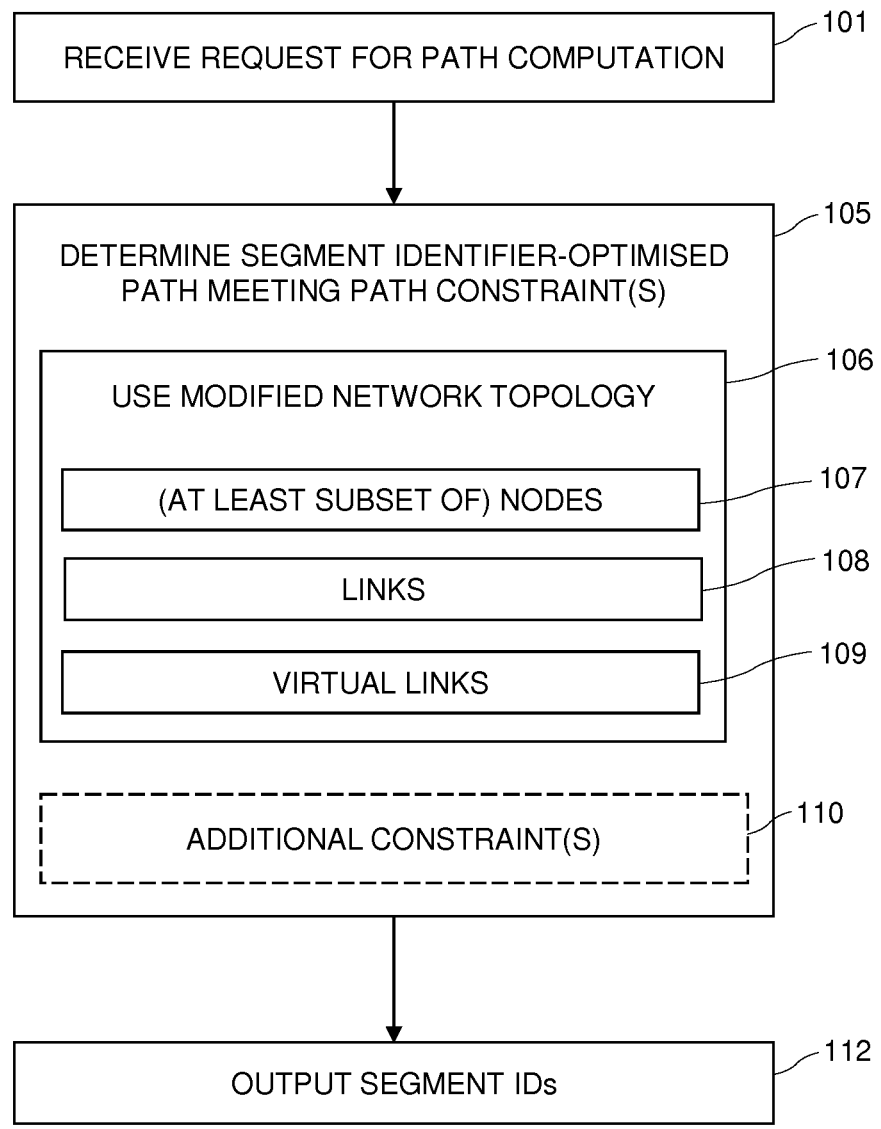
FIG. 3 shows a possible method of path computation.

There are several possible ways in which the PCE 30 can compute a path. FIG. 3 shows a first example of a method which can be performed by the PCE 30.

At block 101 the method receives a request for computation of a path between end nodes in the network. The request includes one or more constraints. At block 105, the method determines a segment identifier-optimised path which meets the constraint. This block uses in 106 a modified topology of the network to evaluate possible paths. The modified (or transformed) topology is based on topology information stored at the PCE. The modified (or transformed) topology is a network topology which is determined and analysed by the PCE for segment identifier calculation, and does not affect the physical network or the network as seen by other entities. The modified topology comprises at least a sub-set of the nodes of the network. In 107, as will be more fully described, the topology may use all of the nodes of the network, or only a sub-set of the nodes of the network. Reducing the number of nodes in the modified network by using only a sub-set provides for a reduction in the complexity of the path computation. This allows the method to be carried out more quickly and/or scale to larger networks.

The modified topology comprises physical links between adjacent nodes. Links between adjacent nodes are analyzed in 108. These are indicative of possible paths between the nodes using adjacency SIDs. The physical links have a metric associated with them.

The modified topology also comprises analyzing in 109 virtual links (or pseudo-links) between pairs of nodes. The virtual links and physical links may be analyzed together, in a single analysis. The term "virtual link" is used because virtual links can represent one or more paths between a pair of nodes. The path, or paths, represented by the virtual links may pass via one or more intermediate nodes. For a given pair of nodes, the virtual link is indicative of one or more possible paths between that pair of nodes which a packet could take if the node-SID of the end node of the pair is used to route that packet. In general, a virtual link from a node A to another node B represents all the unconstrained paths from A to B computed by A when it received the advertisement for node segment B. The virtual link can represent ECMPs. Typically, the ECMPs are calculated without constraints.

Virtual links can have the following metrics associated with them:
- a cost metric based on the metrics of their path, or ECMPs;
- one or more metrics (e.g. delay) based on the minimum and/or maximum values of the path or ECMPs they represent;
- a metric representative of bandwidth information which is based on the path or ECMPs they represent, e.g. minimum free bandwidth bottleneck of the ECMPs;
- usage information based on the path or ECMPs they represent;
- information about Shared Risk Link Groups (SRLGs) and affinities based on the path or ECMPs they represent.

Virtual links have metric values derived from the metrics of the physical links included in the path(s) they represent. In some examples, the worst value of the represented paths (e.g. highest total latency of the paths represented by the virtual link, minimum free bandwidth) is used for each metric. The worst value corresponds to a value for a particular path within the virtual link, which is the worst value in relation to meeting a constraint. Thus, the worst value will fail the constraint by the highest amount, or will pass the constraint by the smallest amount.

As described above, if the virtual link represents ECMPs, the metric can be a worst case value of the individual metrics associated with the equal cost multiple paths. For example, if the virtual link represents two possible ECMPs with delay=3 and delay=5, the metric associated with that virtual link has the value of delay=5. This ensures the path computed at block 105 meets the required constraint.

In a network where multiple physical links exist in parallel between a pair of nodes, with adjacency SIDs that correspond to the physical links, the modified topology can contain one link/edge per Adj-SID. The Adj-SID coincides with the physical link if there is a 1:1 correspondence. For example, three parallel links between nodes A and B may be individually represented by Adj-SIDs α, β and γ. A fourth Adj-SID, δ, may also be provided to represent both α and β(load balanced). The metrics of Adj-SID δ are the maximum of those of α and β. The modified topology can also comprise a virtual link corresponding to node-SID B which represents a possible path between A and B of only the node-SID is used. If there are individual physical links without an Adj-SID they are not individually represented in the modified topology, since it would not be possible to express them in a segment label stack.

During path computation, there may be a path constraint that can be immediately matched against a physical or virtual link (e.g. whether an SRLG associated with the link must be excluded by the path) and there may be a constraint (e.g. a maximum value of delay) which requires calculating a cumulative value of individual metric values of physical links and virtual links of the candidate path. The cumulative value is compared with the path constraint to determine if the candidate path satisfies, or does not satisfy, the constraint.

During path computation by analyzing the modified topology, more than one candidate path may be found. The determination of the segment identifier-optimised path comprises sorting or ranking candidate paths. An example basis for sorting candidate paths is to firstly sort or rank according to the values of metrics/constraints of the candidate paths, with a candidate path most having the more favourable metric/constraint ranked higher than a less favourable metric/constraint. For example, a path is analyzed according to all of the metrics of the links defining the path. The analyzing may be addition of the metrics of the paths defining the path, or the identification of the worst value of the metric along the path (e.g. for the metric bandwidth). If metrics/constraints of candidate paths are equal, then the shorter candidate path has priority. In some examples, the ranking of segment identifier-optimised path is based at least partly on minimizing the number of segment identifiers in the stack defining the segment identifier-optimised path.

The calculation at block 105 may determine a path which meets one or more additional constraints (block 110). These additional constraints may be specified by the entity making the path request or they may be internal to the PCE. Possible additional constraints include: the number of hops of the resulting path must be lower than the maximum label stack depth (MSD) allowed by the routers; a minimum or maximum number of hops; a minimum or maximum number of ECMPs; minimum bandwidth.

Block 105 determines a segment identifier-optimised path. The path can comprise links of any one or both of the two types: links between adjacent nodes and virtual links between nodes. The segment identifier-optimised path can comprise: only virtual links; only links between adjacent nodes (relating to physical links); or a combination of virtual links and links between adjacent nodes (physical links). The segment identifier-optimised path may comprise one, or more than one, of each type of link.

At block 112 the method outputs a set of segment identifiers identifying the determined path. The segment identifier-optimised path found by block 105 is translated into a sequence of node-SIDs and Adj-SIDs. When the segment identifier-optimised path includes a physical link, the relevant adjacency identifier is added to the label stack. When the segment identifier-optimised path includes a virtual link, the node-SID of the end node of the link is added to the label stack. Block 112 can comprise any additional handling of the label stack to comply with the order and coding of the labels according to the segment routing standards. Examples of the invention relate to generating an improved stack of segment identifiers which define a path. The determination of which segment identifiers to use to define the path provides a segment identifier-optimised path.

Figure 4:
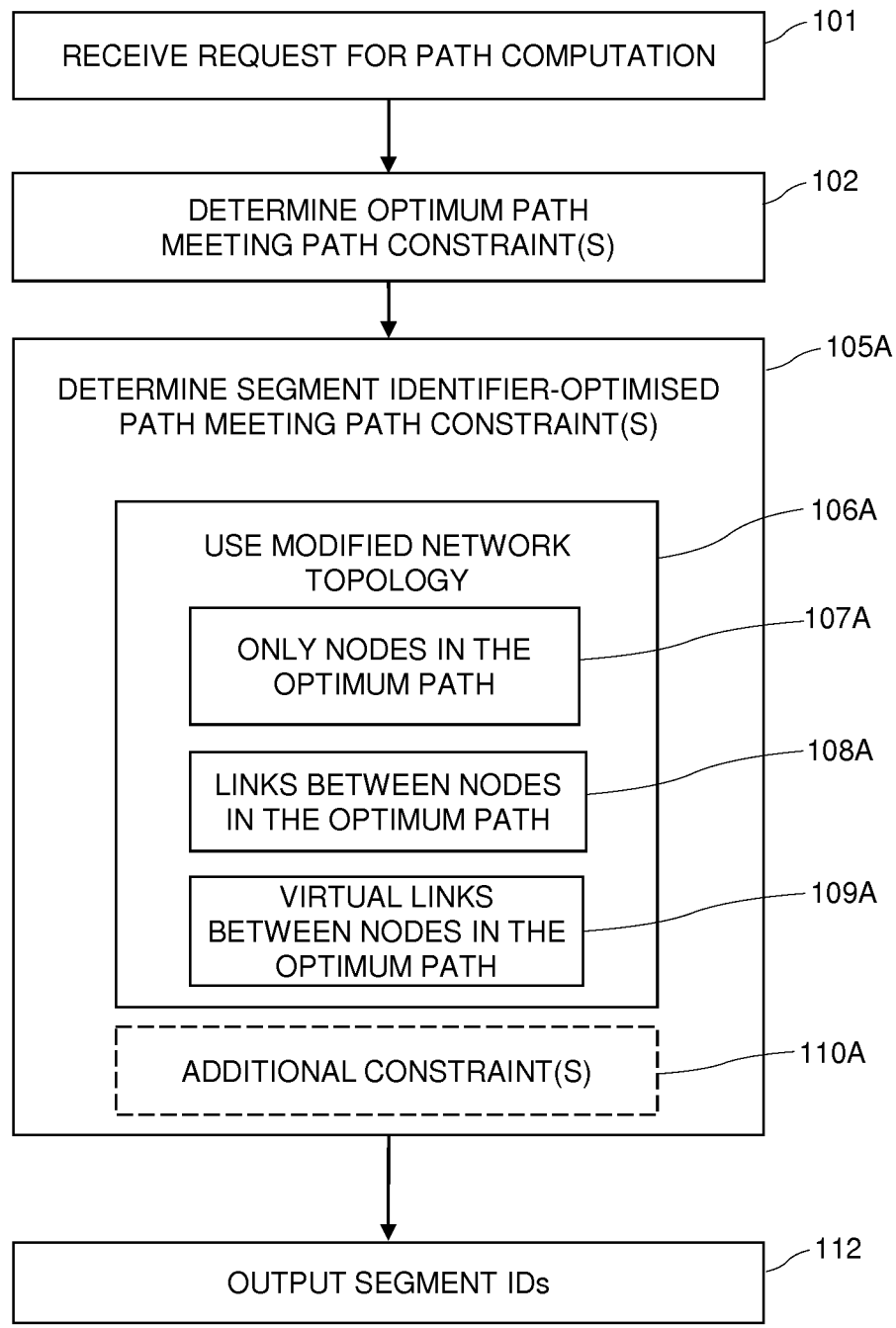
FIG. 4 shows another possible method of path computation.

FIG. 4 shows another example of a method which can be performed by the PCE 30. Blocks 101 and 112 are the same as FIG. 3. Blocks 105A-110A are similar to blocks 105-110 of FIG. 3. The method of FIG. 4 includes an additional block 102 of determining an optimum path meeting the requested path constraints. The optimum path calculation at block 102 can be a constrained shortest path calculation, such as a Constrained Dijkstra algorithm. Typically, the algorithm used at block 102 will only identify a single path having sufficient bandwidth to meet the request and satisfying all of the constraints accompanying the request. This calculation of a shortest path uses conventional techniques to generate the path, and in some examples, generate a list of nodes which define the path.

The method proceeds to block 105A to determine a segment identifier-optimised path which meets the constraint(s). The path calculation is performed with the same constraints as the one in block 102. This block uses in 106A a modified topology of the network to evaluate possible paths. In this example the modified topology comprises only the nodes of the optimum path found in block 102. Typically, this will be a sub-set of the total set of nodes of the network, and can be a significantly reduced number of nodes. In 107A, only the nodes in the conventionally calculated optimum path are used in the modified (or transformed) topology from which the segment identifier-optimised path is generated. This can reduce the complexity of the computation, allowing the method to scale to larger networks.

The modified topology comprises the links between nodes present in the optimum path. These are indicative of possible paths between the nodes using adjacency SIDs. The links have a metric/constraint associated with them.

The modified topology also comprises virtual links between pairs of nodes. Virtual links are only provided between the nodes found in the optimum path of block 102. As explained above, for a given pair of nodes the virtual link is indicative of one or more possible paths between that pair of nodes which traffic could take. The virtual path may be defined by the node-SID of the end node of the pair of nodes.

The virtual link can represent ECMPs. The virtual link has an attribute or metric associated with it. If the virtual link represents multiple paths, the metric has a value corresponding to a worst case link, as described above. Stated another way, block 105A uses a network where the vertexes are the nodes included in the already computed optimum single path of block 102, and the edges are the edges of the optimal path plus a virtual link between each couple of the path nodes, which correspond to the unconstrained shortest ECMPs, as represented by the node-SIDs.

Although virtual links are only formed between the subset of nodes, the path or ECMPs represented by a virtual link can be routed via any of the nodes of the network, including nodes removed from the overall (actual) network. The path calculation on a network comprising virtual links allows an optimized stack of segment identifiers which meet the constraint(s) to be generated.

At block 112 the method outputs a set of segment identifiers identifying the determined path. The path is defined by an improved set of segment identifiers.

Figure 5:
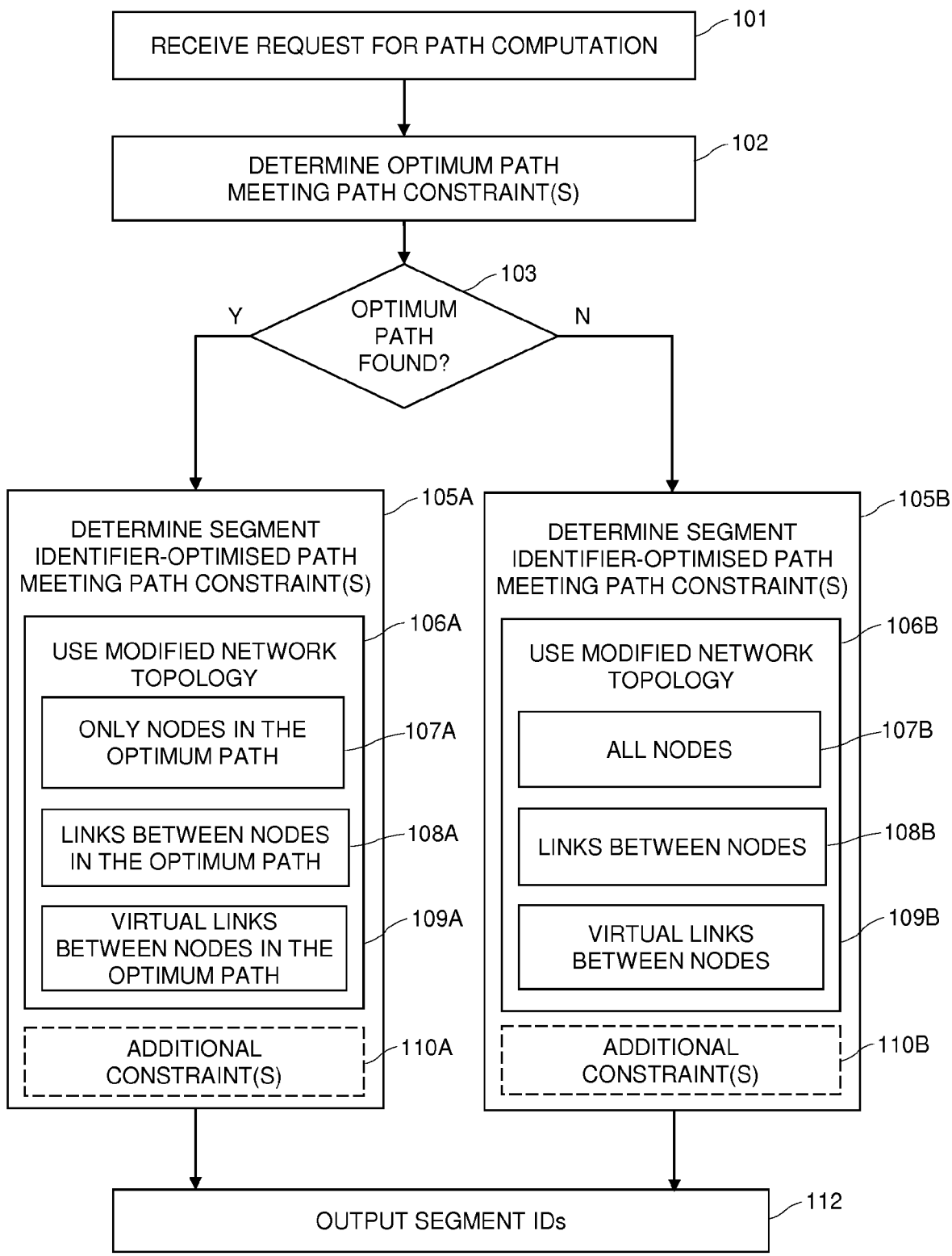
FIG. 5 shows another possible method of path computation.

FIG. 5 shows another example of a method which can be performed by the PCE 30. Blocks 101, 102, 105A, 106A, 107A, 108A, 109A, 110A and 112 are the same as FIG. 4. Additionally, a further block 103 of the method determines if it was possible to find an optimum path. Under some circumstances, an optimum (e.g. shortest) path cannot be found. For example, it may not be possible to find a single path which has free bandwidth equal to, or higher than, the requested bandwidth. If an optimum path is found at block 102, the method proceeds to block 105A and uses the nodes found in the optimum path of block 102. This is the same as described for FIG. 4. If an optimum path is not found at block 102, the method proceeds to block 105B and determines a segment identifier-optimised path which meets the constraint(s). This block uses 106B a modified topology of the network to evaluate possible paths. The modified topology comprises all of the nodes of the network. The modified topology comprises links 108B and virtual links 109B as described for FIG. 3. Although this requires a more complex topology, and more computation, it can allow a path to be found as ECMPs are found and ECMPs having bandwidth which sums to the required bandwidth can be used to meet the required bandwidth.

The complexity of the method shown in FIG. 4 and FIG. 5 (102, 105A-110A) is reduced as the network used in block 106A has a reduced number of nodes and physical links. On average, the expected value should be the diameter of the original network. The number of virtual links grows quadratically with respect to the number of nodes, which should be around the square root of the total number of nodes in the network. Therefore, the path computation at block 105A will have a complexity similar to the path computation at block 102. This allows a more scalable solution.

Figure 6:
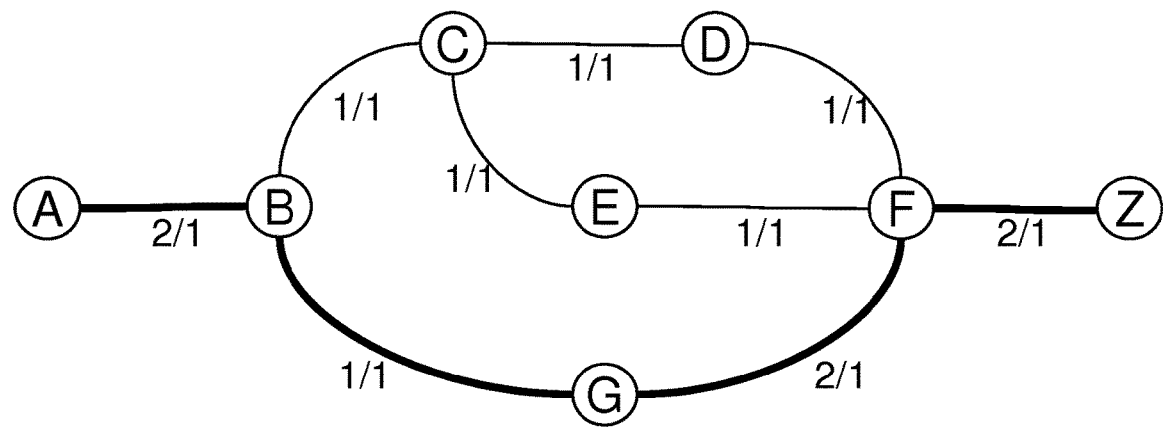
FIGS. 6-9 show an example of path computation.

Some worked examples of the path computation method will now be described. FIG. 6 shows an example network, which corresponds to the example network 20 of FIG. 2. In this first example, an optimum path is found (block 102, FIGS. 4 and 5), before determining a segment identifier-optimised path. The network 20 has nodes A-G and Z. In FIG. 6, each link between an adjacent pair of nodes shows two items: a routing cost metric and a metric/constraint. The routing cost can be an Interior Gateway Protocol (IGP) metric. The metric/constraint can be a delay. For example, the link between node A and node B has a cost of 2 and a delay metric of 1. Consider the path request (block 101 of FIGS. 3-5) requires a path between the end nodes A and Z with a constraint of 5. For example, the requested shortest path between A and Z should have a delay of maximum value=5.

Block 102 (FIGS. 4 and 5) calculates the shortest path between nodes A and Z. There are three possible shortest paths between A and Z which meet the delay constraint (i.e. total path delay has max. value of 5):
 (i) A-B-C-D-F-Z;
 (ii) A-B-C-E-F-Z;
 (iii) A-B-G-F-Z.

All of the paths (i)-(iii) have the same cost=7. A-B-G-F-Z has the lowest number of hops. By sorting the candidate paths (i)-(iii) according to lowest number of hops, candidate path (iii) is selected as the optimum path by block 102. This path is shown in FIG. 6.

Figure 7:
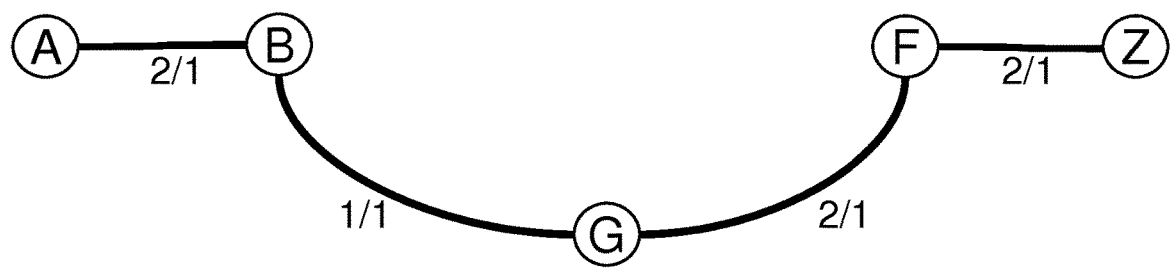

The method further determines a segment identifier-optimised path using a modified topology. The modified topology comprises only the nodes found in the optimum path, i.e. nodes A, B, G, F, Z. The modified topology also comprises the links of the path found in block 102, and their associated constraint. FIG. 7 shows the modified topology. The modified topology also comprises virtual links between any pairs of the nodes A, B, G, F and Z. For each pair of nodes, the virtual link represents one or more paths between that pair of nodes. If there are ECMPs, the virtual link indicates the worst case metric of the ECMPs. The virtual link represents the possible paths that traffic could be routed along if only the node-SID is used.

Figure 8:
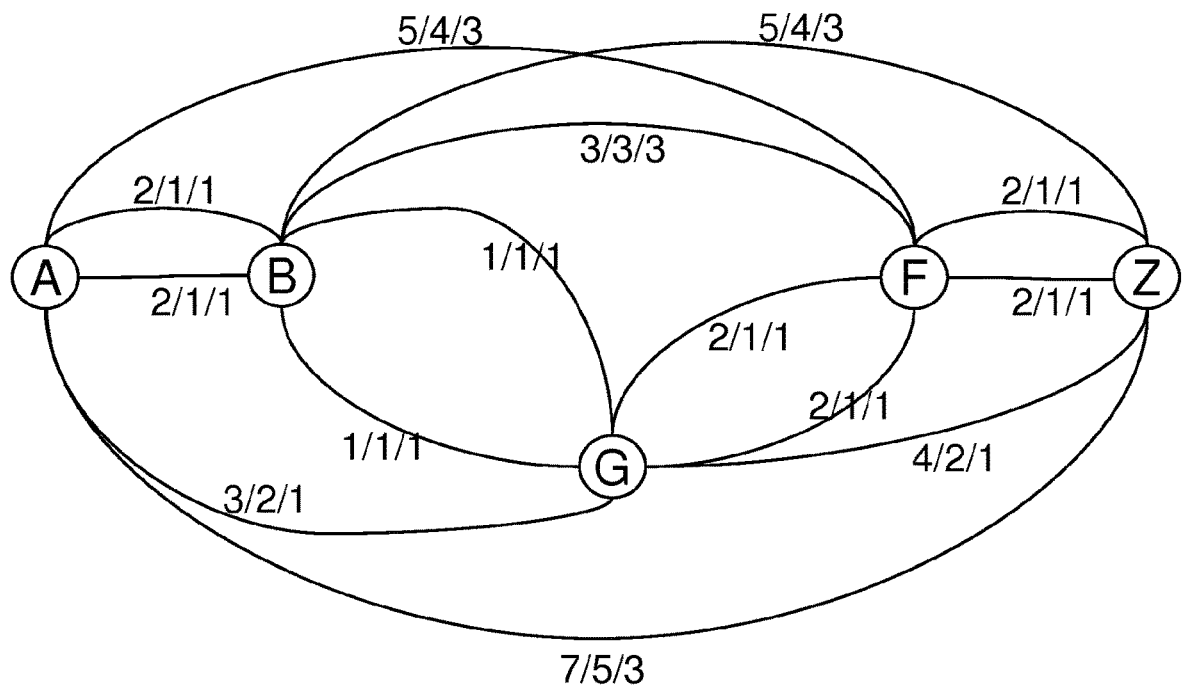

For example, there are 3 ECMPs between nodes B and F: (i) B-C-D-F; (ii) B-C-E-F; (iii) B-G-F. If traffic arriving at node B only saw the node-SID "F", traffic could be sent along any of the paths (i)-(iii). The virtual link B-F represents the three ECMPs. The virtual link B-F also indicates a worst case metric. B-C-D-F and B-C-E-F have a metric of 3. B-G-F has a metric of 2. The virtual link B-F indicates the worst case metric of 3. FIG. 8 shows the modified topology including the virtual links.

Figure 9:
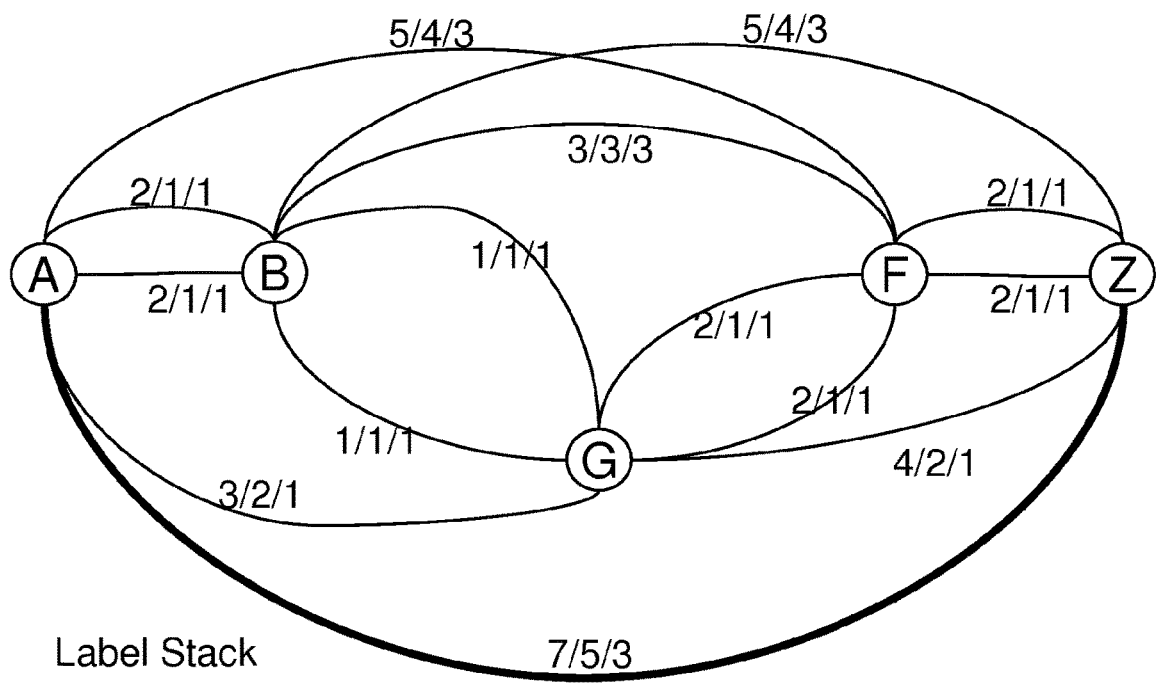

The method uses the modified topology of FIG. 8 to find a segment identifier-optimised path. In this example the requested path between nodes A and Z should have a delay of maximum value=5. The method tests possible combinations of links and/or virtual links to find end-to-end candidate paths. One or more of the candidate paths may meet the required constraint(s). FIG. 9 shows the result of this calculation. Embodiments are arranged to select the optimized set of segment identifiers which meets the constraints. For example, the set (stack) of segment identifiers may be optimized by selecting the set with a minimum number of segment identifiers. Alternatively, or in addition, the set of segment identifiers selected is a set which has a number of segment identifiers within a maximum number.

Using the modified topology, it can be seen that the virtual link A-Z meets this constraint, as it has a worst case delay=5. The virtual link A-Z represents three ECMPs between node A and node Z. The worst case metric value of the three ECMPs=5. Therefore, the node-SID "Z" can safely be used without any other node-SIDs or Adj-SIDs. Regardless of which one of the ECMPs nodes A-G choose to route the traffic along, the shortest path to node Z will meet the constraint. Block 112 outputs the node-id at the end of the virtual link A-Z, which is the node-SID of node Z. It can be seen that the method has determined a segment identifier-optimised path which meets the required path constraint while only requiring one SID (the node-SID "Z").

The path is a segment identifier-optimised path because it requires less SIDs compared to using a full list of node-SIDs and/or Adj-SIDs to define an end-to-end path between node A and node Z. The segment identifier-optimised path defines a path which includes the optimum path found in the initial step of 102. The segment identifier-optimised path may include (i.e. allow routing over) any paths as defined by the selected segment identifier(s). This is because a node segment identifier allows any path to that node. The method ensures that all paths defined by the segment identifier-optimised path meet the constraints.

In the modified topology of FIGS. 8 and 9 each virtual link has a parameter indicative of a number of ECMPs represented by that virtual link. The method may select a path which maximises the number of ECMPs so as to improve load balancing. Alternatively, the method may select a path which represents a single path, and prevents ECMPs.

In any of the examples, one of the possible constraints is a required bandwidth. The method attempts to find a segment identifier-optimised path with the required bandwidth. Each link and each virtual link can have a metric value indicative of available bandwidth. In the case of the virtual link, the metric value can be indicative of available bandwidth summed across ECMPs. The metric value can be a worst case bandwidth, representing the minimum available bandwidth along a part of the path. In the case of bandwidth, it will be understood that determining a segment identifier-optimised path checks that each link or virtual link along a candidate path meets the bandwidth requirement.

Figure 10:
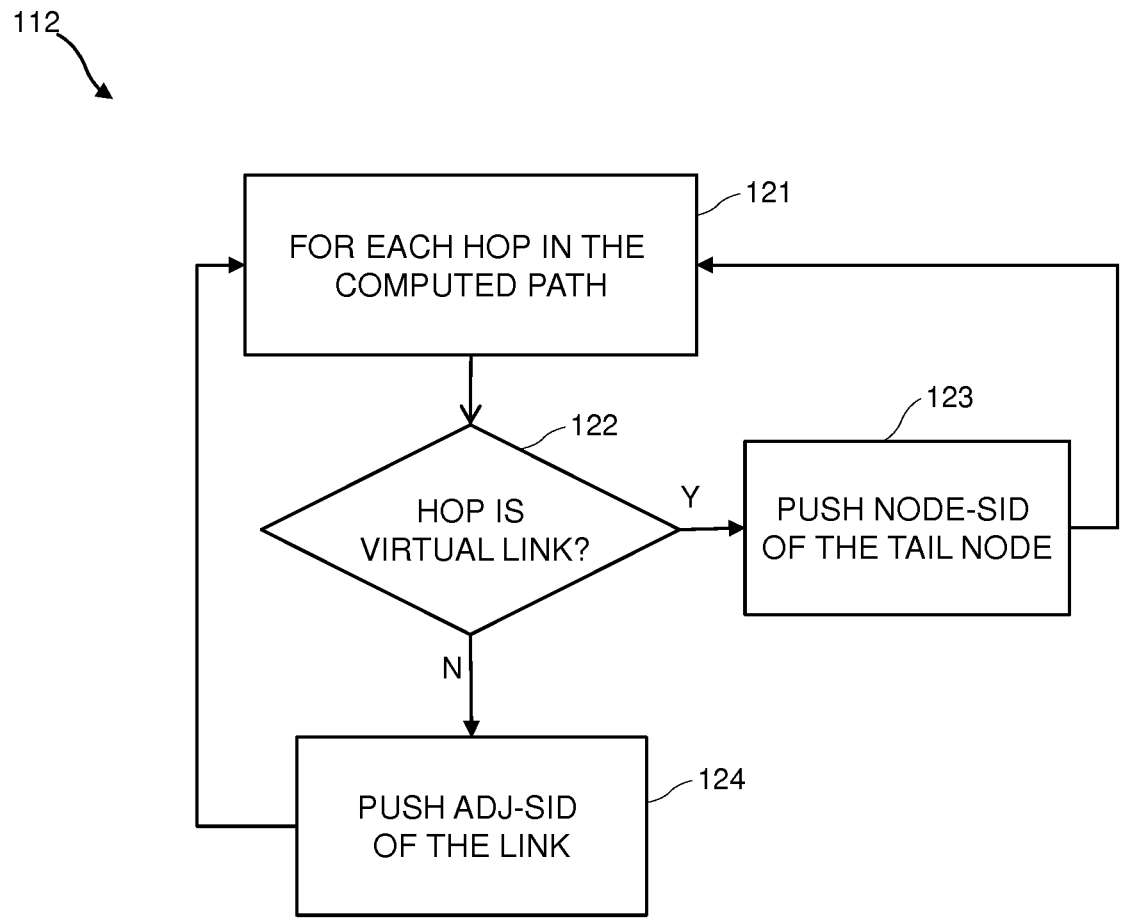
FIG. 10 shows a method of outputting segment identifiers.

FIG. 10 shows more detail of block 112 of the methods of FIGS. 3-5. After determining a path at block 105, 105A, 105B, the method outputs a SID for each hop of the determined path. The method determines at block 122 if the hop is a virtual link. If the hop is a virtual link, the method outputs, at block 123, the node-SID of the tail node of the virtual link. If the hop is not a virtual link, the method outputs, at block 124, the Adj-SID of the node of the link. If the Adj-SID is local, it is prefixed with a global identifier, e.g. the node-SID of the node originating the link, unless that node-SID or another adjacent Adj-SID has already been put onto the stack. If the originating node-SID is the ingress node, there is no need to add that onto the stack because a label stack may start with an Adj-SID of a link starting from the ingress node.

Block 112 can also use one or more of the following rules. Two consecutive equal nodes in the stack are merged. An equal node means two identical node-SIDs, which refer to the same node. This may happen if the first label put in the stack is node X, and then it is requested to add as a second label an Adj-SID of a link of the node X. As X is already on top of the stack there is no need to add it twice. Two consecutive Adj-SIDs collapse the intermediate node (not pushed onto the stack). As a local Adj-SID is recognised by the node originating the link, the labels should clarify which node is "consuming" that Adj-SID. If there is an Adj-SID Y on top of the stack, representing say the link between node A and node B, it shall be prefixed (in general) with node-SID A. Node-SID A and adj-SID Y define the path to node B. If there is an Adj-SID Z, representing a link originated by node B, there is no need to insert also node-SID B, as node B knows how to manage Z. The ingress node of the path is not pushed to the label stack.

Figure 11:
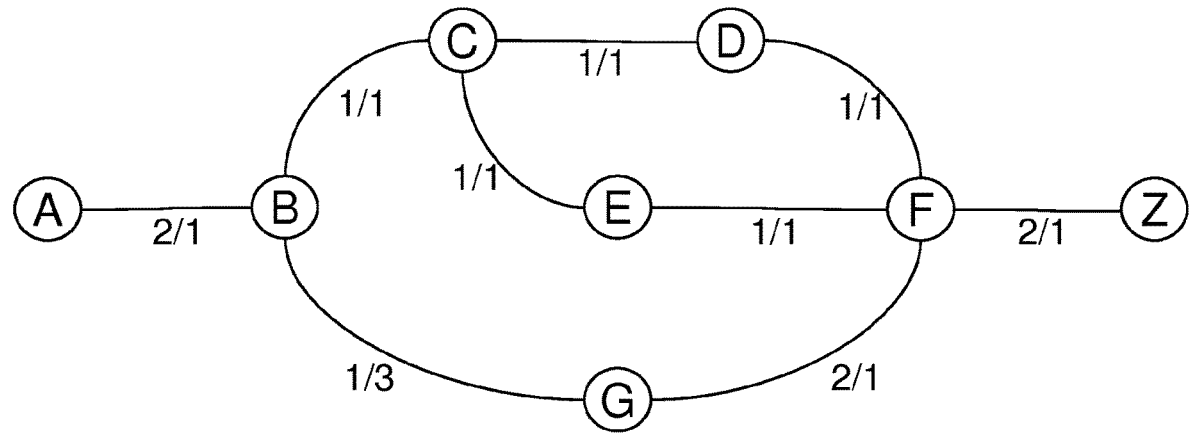
FIGS. 11-15 show another example of path computation.
Figure 12:
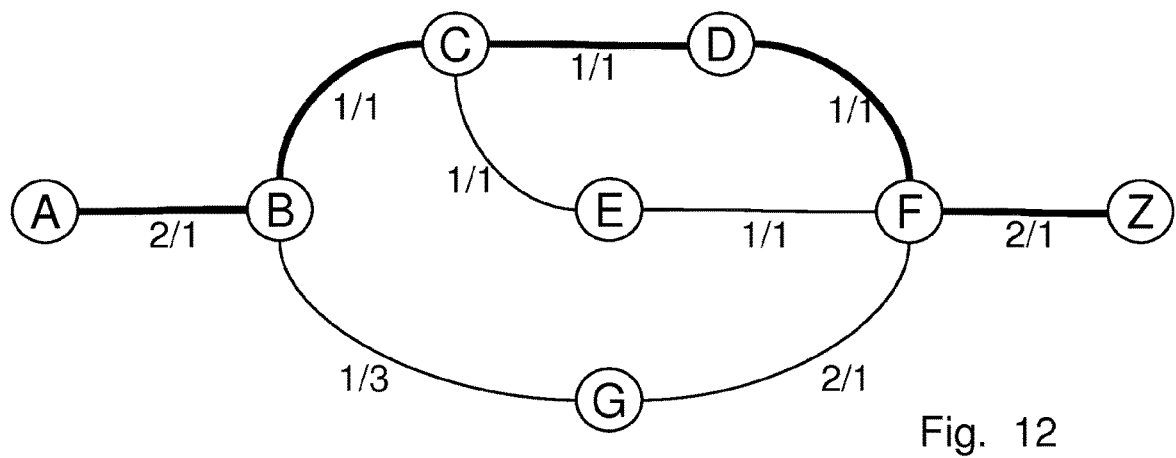

FIG. 11 shows another worked example. The network is the same as the previous example apart from the delay on the link between nodes B and G is higher, delay=3. Again, in this example an optimum path is found (block 102, FIGS. 4 and 5) before determining a segment identifier-optimised path. The optimum path is selected as A-B-C-D-F-Z, as shown in FIG. 12.

Figure 13:
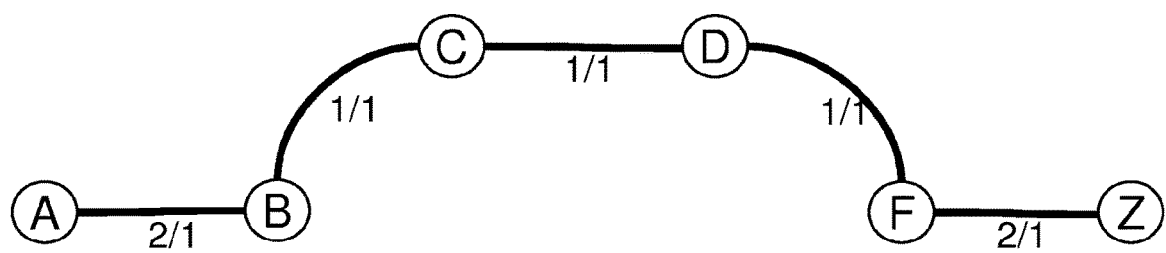
Figure 14:
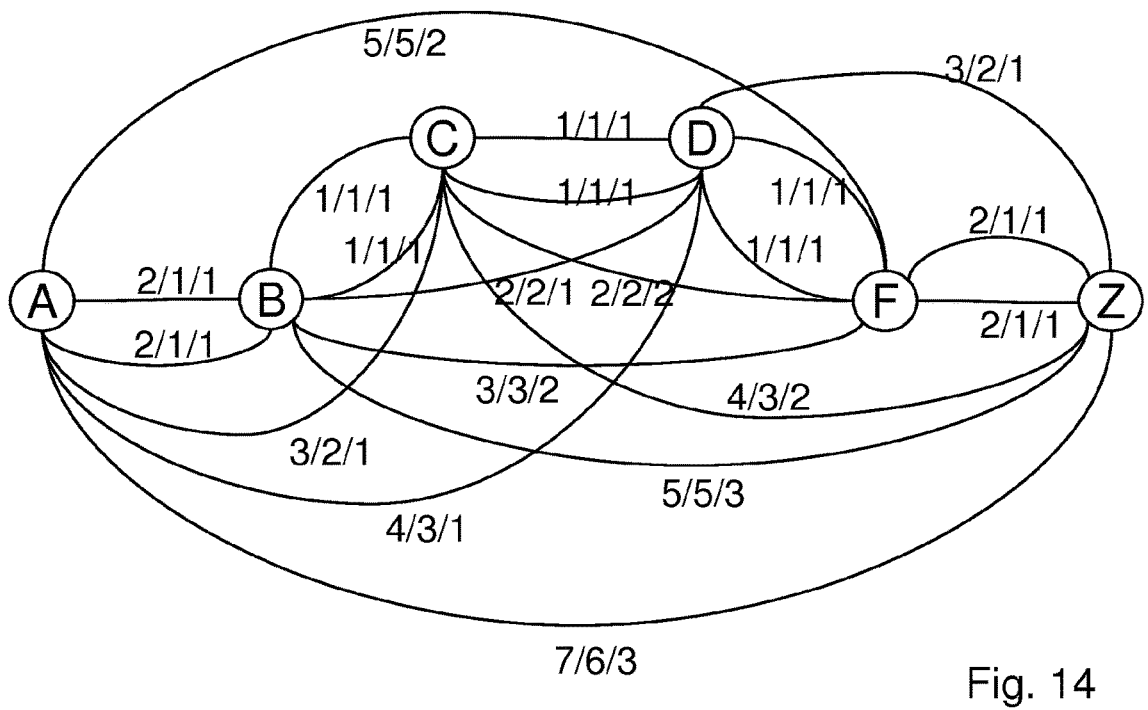

The method determines a segment identifier-optimised path based on a modified topology. The modified topology comprises only the nodes found in the optimum path, i.e. nodes A, B, C, D, F, Z. The modified topology also comprises the links of the path found in block 102 (i.e. between the nodes of the optimum path), and their associated metric. FIG. 13 shows the modified topology. The modified topology also comprises virtual links between pairs of the nodes A, B, C, D, F and Z. The virtual links analyzed are between every combination of two nodes. For each pair of nodes, the virtual link represents one or more paths between that pair of nodes. If there are ECMPs, the virtual link indicates the worst case metric of the ECMPs, i.e. worst case relative to the constraint. The virtual link represents the possible paths that traffic could be routed along if only the node-SID is used. FIG. 14 shows the modified topology including the virtual links. As such, the modified topology comprises only the nodes of the determined optimum path, and (virtual) links between each combination of two nodes.

Figure 15:
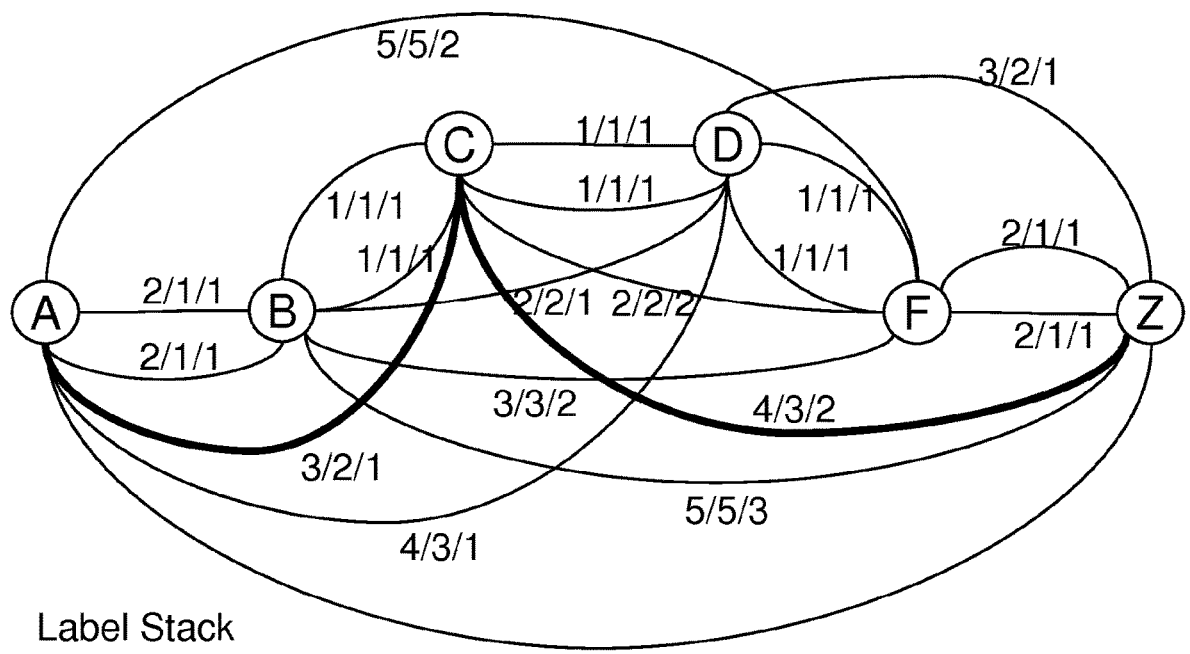
Figure 15:
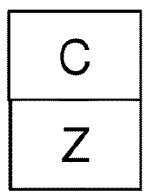

The method uses the modified topology of FIG. 14 to find a segment identifier-optimised path. The method determines which paths in the modified topology meet the constraint(s). If more than one path meets the constraints, then other metrics or parameters (e.g. a parameter which is not a constraint (e.g. cost, delay, number of hops, number of ECMPs) and/or minimum number of segment identifiers) are considered to determine which path is the optimal path. Therefore, from the possible paths of the modified topology, the possible paths over the links and virtual links are ranked to determine which one is the optimal. In this example the requested path between nodes A and Z should have a delay of maximum value=5. FIG. 15 shows the result. The selected path includes the virtual link A-C and the virtual link C-Z. This can be represented by a label stack having just the node-SIDs C and Z.

In this example it can be seen that the virtual link A-Z has a total delay metric of 6, which is more than the requested maximum value of the constraint (max. delay=5). There are several potential two-hop paths: A-B-Z, A-C-Z, A-D-Z and A-F-Z. A-B-Z and A-F-Z have a total metric which is greater than the requested constraint. A-C-Z and A-D-Z both meet the requested constraint. A-C-Z has the higher number of ECMPs (=2) whereas A-D-Z avoids ECMPs. A-C-Z is selected as the segment identifier-optimised path. The resulting segment identifier-optimised path has the stack: C, Z because the ingress node-SID (A) can be dropped. The segment identifier-optimised path has a minimum or reduced stack of segment identifiers, whilst still including The segment identifier-optimised path may differ, depending on the other constraints imposed on the method. For example, path A-D-Z may be selected if the method is constrained to select a path which prevents ECMPs. It can be seen that the method has determined a segment identifier-optimised path which meets the required path constraint while only requiring two SIDs. The path is a segment identifier-optimised path because it requires less SIDs compared to using a full list of node-SIDs and/or Adj-SIDs to define an end-to-end path between node A and node Z.

Figure 16:
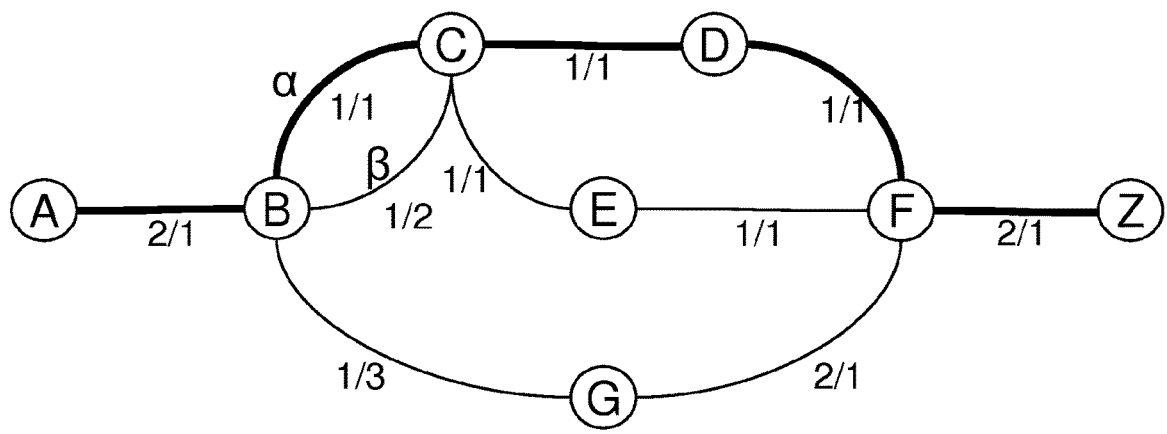
FIGS. 16 and 17 show another example of path computation.

FIG. 16 shows another worked example. The network is the same as the previous example apart from the provision of two links between nodes B and C. Nodes B and C are connected by links with segment identifiers α and β. Again, in this example an optimum path is found (block 102, FIGS. 4 and 5) before determining a segment identifier-optimised path. The optimum path is selected as A-B-C-D-F-Z, using the a link between B and C.

The method determines a segment identifier-optimised path using a modified topology. The modified topology comprises only the nodes found in the optimum path, i.e. nodes A, B, C, D, F, Z. The modified topology also comprises the links of the path found in block 102, and their associated constraint. The link α between B and C is included in the modified topology, because it is present in the shortest path. The link β between B and C is not included in the modified topology, because it is not present in the shortest path.

Figure 17:
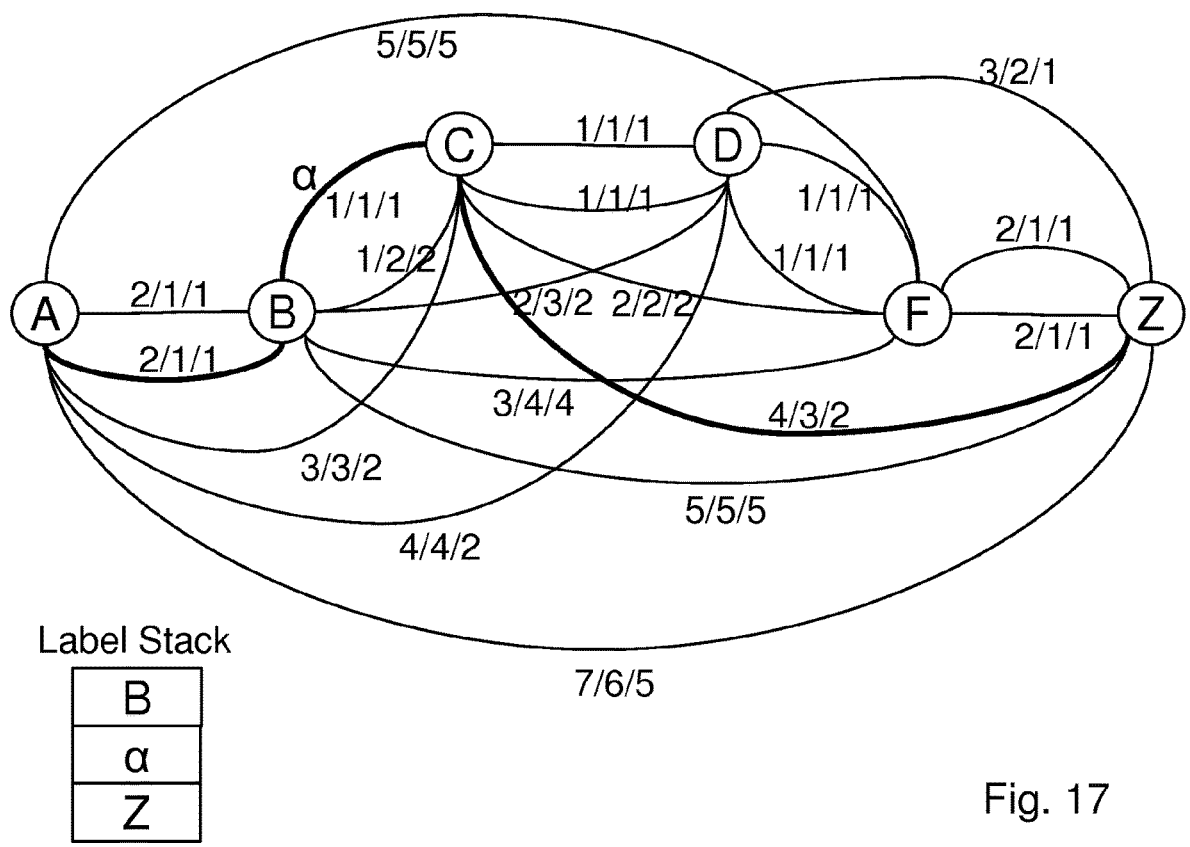

FIG. 17 shows the modified topology. The modified topology also comprises virtual links between pairs of the nodes A, B, C, D, F and Z. For each pair of nodes, the virtual link represents one or more paths between that pair of nodes. If there are ECMPs, the virtual link indicates the worst case metric of the ECMPs. The virtual link represents the possible paths that traffic could be routed along if only the node-SID is used. FIG. 17 shows the modified topology including the virtual links. The virtual link between nodes B and C has the values "1/2/2", corresponding to the cost=1, worst case metric (=2, for link β), and the number of possible paths/links=2 (representing links α and β).

The method uses the modified topology of FIG. 17 to find a segment identifier-optimised path. In this example the requested path between nodes A and Z should have a delay of maximum value=5. The selected path includes the virtual link A-B, the link α and the virtual link C-Z. This can be represented by a label stack having just the node-SID B, the Adj-SID α, and the node-SID Z. In this example it can be seen that the virtual link A-Z has a metric of 6, which is more than the requested maximum value of the constraint (delay=5). There are several potential two-hop paths: A-B-Z, A-C-Z, A-D-Z, A-F-Z but each has a metric which is greater than the requested maximum. In this example it is necessary to steer traffic via link α to meet the constraint, i.e. along the path A-B-α-C-Z. The resulting segment identifier-optimised path has the stack: B, a, Z because the ingress node-SID (A) can be dropped, and it is not necessary to specify node-SID C because Adj-SID α leads to node C. The path is a segment identifier-optimised path because it requires less SIDs compared to using a full list of node-SIDs and/or Adj-SIDs to define an end-to-end path between node A and node Z.

Figure 18:
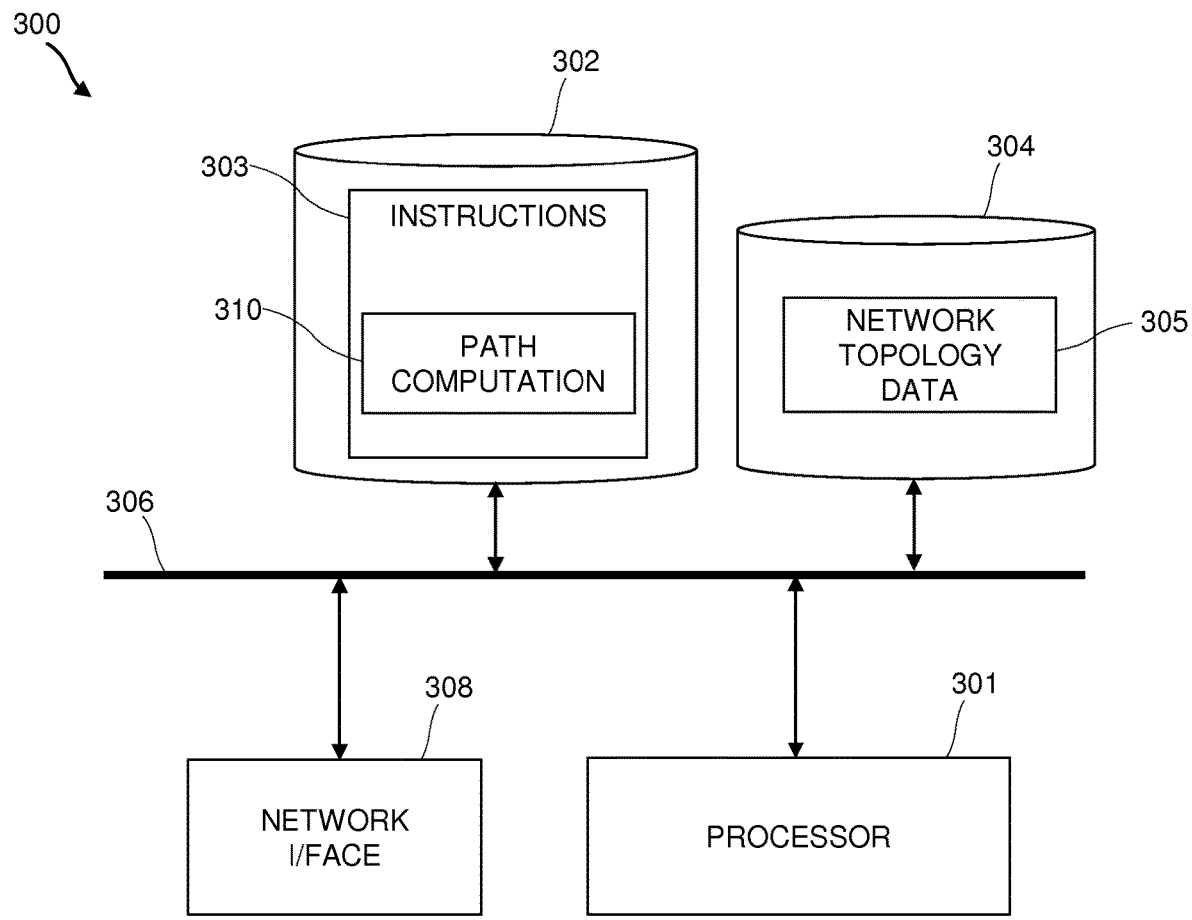
FIG. 18 shows apparatus for a computer-based implementation of the methods.

FIG. 18 shows an exemplary processing apparatus 300 which may be implemented as any form of a computing and/or electronic device, and in which embodiments of the system and methods described above may be implemented. Processing apparatus 300 can be provided at the PCE, or at a node forming part of the network. Processing apparatus 300 may implement the method shown in any of FIGS. 3 to 5. Processing apparatus 300 comprises one or more processors 301 which may be microprocessors, controllers or any other suitable type of processors for executing instructions to control the operation of the device. The processor 301 is connected to other components of the device via one or more buses 306. Processor-executable instructions 303 may be provided using any computer-readable media, such as memory 302. The processor-executable instructions 303 can comprise instructions for implementing the functionality of the described methods. The memory 302 is of any suitable type such as read-only memory (ROM), random access memory (RAM), a storage device of any type such as a magnetic or optical storage device. Additional memory 304 can be provided to store data 305 used by the processor 301. The processing apparatus 300 comprises one or more network interfaces 308 for interfacing with other network entities. For example, a Path Computation Element Protocol (PCEP) can be provided for receiving path computation requests and for delivering a result of a path computation request (i.e. a set of SIDs) to a node of the network, so that the node can insert the SIDs into a header of a packet to perform segment routing of the traffic.

Figure 19:
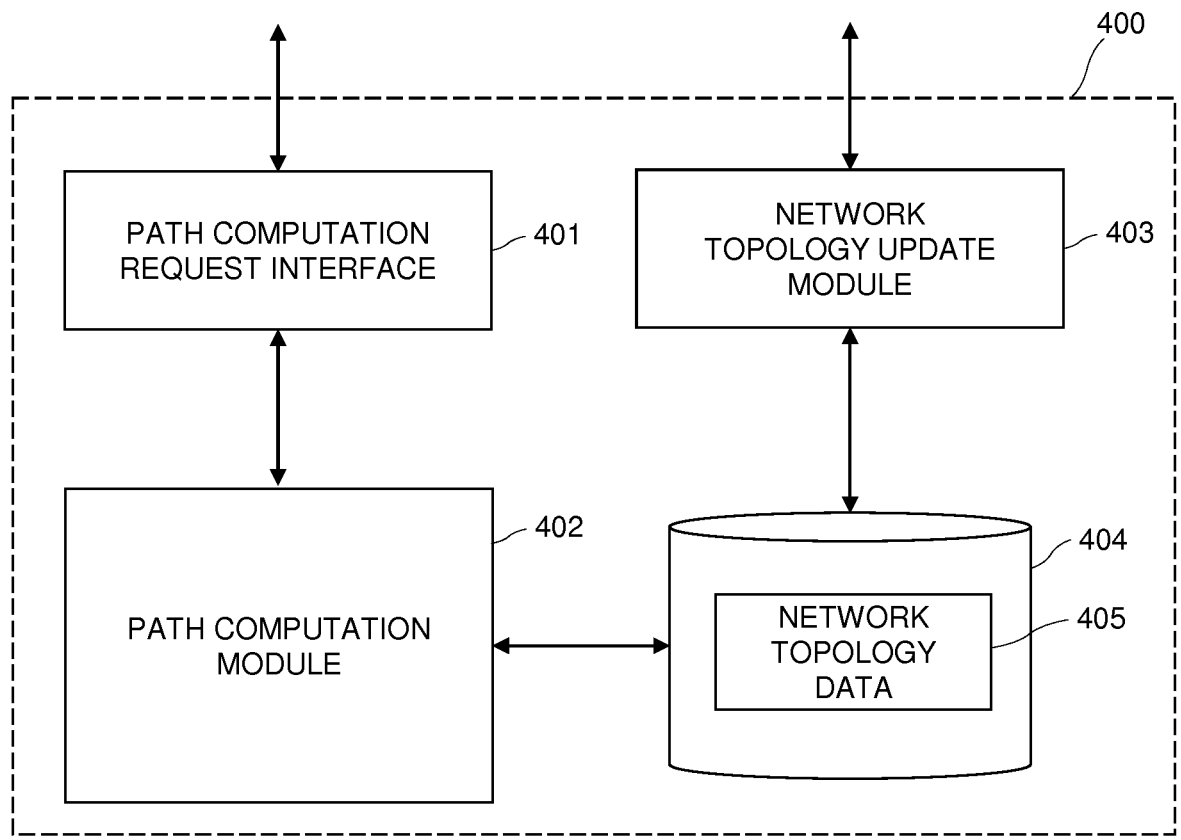
FIG. 19 shows apparatus for performing path computation.

FIG. 19 shows apparatus for path computation. The apparatus 400 comprises an interface (e.g. a PCEP interface) configured to receive path requests and to send information about computed paths to nodes. A path computation module is configured to perform any of the described methods of path computation. A store 404 holds network topology data 405. A network topology update module 403 is configured to receive information from the network, such as advertisements from nodes about node-SIDs and Adj-SIDs.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation. Any example of the method or apparatus may be used in combination with any other example of the method or apparatus.

The invention claimed is:

1. A method of path computation in a segment routing network, the segment routing network comprising a set of nodes, the method comprising:
   receiving a request for computation of a path between end nodes in the segment routing network, the request including a path constraint;
   determining an initial optimum path, between the end nodes, which meets the path constraint using a full topology of the segment routing network, the initial optimum path being defined by a sequence of hops between a sub-set of the set of nodes, wherein the end nodes are comprised in the sub-set of the set of nodes;
   determining a segment identifier-optimised path defined by a stack of one or more segment identifiers, wherein the segment identifier-optimised path meets the path constraint,
   wherein the determining of the segment identifier-optimised path comprises analysing a topology that comprises:
      the sub-set of the set of nodes, wherein the sub-set of the set of nodes comprises nodes of the initial optimum path,
      links between the nodes of the initial optimum path, and
      virtual links between the sub-set of the set of nodes, wherein each link and each virtual link has an associated metric, and the segment identifier-optimised path is determined by comparing the metric(s) associated with the links and/or virtual links defining paths of the segment routing network; and outputting at least one segment identifier which defines the determined segment identifier-optimised path.

2. The method according to claim 1, wherein the determining of the initial optimum path comprises determining a shortest path, between the end nodes, which meets the path constraint.

3. The method according to claim 1, wherein, when it is not possible to determine the initial optimum path which meets the path constraint, the method proceeds to the determining of a segment identifier-optimised path using a topology comprising the set of the nodes of the segment routing network.

4. The method according to claim 1, wherein each virtual link between a pair of nodes represents a single path between the pair of the nodes or equal cost multiple paths between the pair of the nodes.

5. The method according to claim 1, wherein the metric associated with a virtual link represents a worst case metric of individual metrics associated with multiple paths indicated by the virtual link.

6. The method according to claim 1, wherein each virtual link has a metric indicative of a number of equal cost multiple paths represented by the respective virtual link, and
wherein the segment identifier-optimised path is determined on a basis of the number of equal cost multiple paths represented by the respective virtual link.

7. The method according to claim 1, wherein the segment identifier-optimised path is determined on a basis of available bandwidth of the segment identifier-optimised path and/or on a basis of a number of hops in the segment identifier-optimised path.

8. The method according to claim 1, wherein the segment identifier-optimised path is determined on a basis of one or more of:
a minimum number of segment identifiers; and
a number of segment identifiers less than a maximum label stack depth.

9. The method according to claim 1, wherein outputting of the at least one segment identifier which defines the determined segment identifier-optimised path, comprises one or more of:
for a hop of the segment identifier-optimised path defined by a virtual link, outputting a node segment identifier of a node at a tail of the virtual link; and
for a hop of the segment identifier-optimised path defined by a link, outputting an adjacency segment identifier of the link.

10. An apparatus for path computation in a segment routing network, the segment routing network comprising a set of nodes, the apparatus comprising a processor and memory, the memory containing instructions executable by the processor whereby the apparatus is operative to:
receive a request for computation of a path between end nodes in the segment routing network, the request including a path constraint;
determine an initial optimum path, between the end nodes, which meets the path constraint using a full topology of the segment routing network, the initial optimum path being defined by a sequence of hops between a sub-set of the set of nodes, wherein the end nodes are comprised in the sub-set of the set of nodes;
determine a segment identifier-optimised path defined by a stack of one or more segment identifiers, wherein the segment identifier-optimised path meets the path constraint,
wherein the determination of the segment identifier-optimised path comprises analysis of a topology that comprises:
the sub-set of the set of nodes, wherein the sub-set of the set of nodes comprises nodes of the initial optimum path,
links between the nodes of the initial optimum path, and
virtual links between the sub-set of the set of nodes,
wherein each link and each virtual link has an associated metric, and the segment identifier-optimised path is determined by comparing the metric(s) associated with the links and/or virtual links defining paths of the segment routing network, and
wherein the apparatus is configured to output at least one segment identifier which defines the determined segment identifier-optimised path.

11. The apparatus according to claim 10, wherein to determine the initial optimum path, the apparatus is operative to determine a shortest path, between the end nodes, which meets the path constraint.

12. The apparatus according to claim 10, wherein each virtual link between a pair of nodes represents a single path between the pair of the nodes or equal cost multiple paths between the pair of the nodes.

13. The apparatus according to claim 10, wherein the metric associated with a virtual link represents a worst case metric of individual metrics associated with multiple paths indicated by the virtual link.

14. The apparatus according to claim 10, wherein the apparatus is operative to output the at least one segment identifier which defines the determined segment identifier-optimised path by one or more of:
for a hop of the segment identifier-optimised path defined by a virtual link, outputting a node segment identifier of a node at a tail of the virtual link; and
for a hop of the segment identifier-optimised path defined by a link, outputting an adjacency segment identifier of the link.

15. A non-transitory machine-readable medium carrying instructions which, when executed by a processor, cause the processor to perform a method of path computation in a segment routing network, the segment routing network comprising a set of nodes, the method comprising:
receiving a request for computation of a path between end nodes in the segment routing network, the request including a path constraint;
determining an initial optimum path, between the end nodes, which meets the path constraint using a full topology of the segment routing network, the initial optimum path being defined by a sequence of hops between a sub-set of the set of nodes, wherein the end nodes are comprised in the sub-set of the set of nodes;
determining a segment identifier-optimised path defined by a stack of one or more segment identifiers, wherein the segment identifier-optimised path meets the path constraint,
wherein the determining of the segment identifier-optimised path comprises analysing a topology that comprises:
the sub-set of the set of nodes, wherein the sub-set of the set of nodes comprises nodes of the initial optimum path, links between the nodes of the initial optimum path, and virtual links between the sub-set of the set of nodes, wherein each link and each virtual link has an associated metric, and the segment identifier-optimised path is determined by comparing the metric(s) associated with the links and/or virtual links defining paths of the segment routing network; and outputting at least one segment identifier which defines the determined segment identifier-optimised path.

* * * * *